United States Patent [19]

Riley et al.

[11] Patent Number: 5,075,358

[45] Date of Patent: Dec. 24, 1991

[54] MULTIPLE PURPOSE PATCHING COMPOSITION

[76] Inventors: Victor Riley, 26 Dunedin Drive, Toronto, Ontario, Canada, M8X 2K5; Krishnamurthy Muralidharan, 4309-F Trinity Ave., Greensboro, N.C. 27407

[21] Appl. No.: 464,626

[22] Filed: Jan. 3, 1990

Related U.S. Application Data

[63] Continuation of Ser. No. 167,991, Mar. 14, 1988, abandoned.

[51] Int. Cl.$^5$ .......................... C08L 9/08; C08L 13/02
[52] U.S. Cl. ............................................ 524/5; 524/6; 524/7; 524/8; 106/689; 106/778; 106/802
[58] Field of Search ................. 106/90, 689, 778, 802; 524/2, 4, 5, 6, 7, 8

[56] References Cited

U.S. PATENT DOCUMENTS

| | | | |
|---|---|---|---|
| 2,238,975 | 4/1941 | Crossfield | 106/90 |
| 3,940,358 | 2/1976 | Bernett et al. | 524/386 |
| 4,367,093 | 1/1983 | Burkhalter et al. | 106/90 |

FOREIGN PATENT DOCUMENTS

| | | | |
|---|---|---|---|
| 1143385 | 3/1983 | Canada | 261/50 |
| 51-018786 | 2/1976 | Japan | 106/90 |
| 0617424 | 7/1978 | U.S.S.R. | 106/90 |
| 1498297 | 1/1978 | United Kingdom | 106/94 |

*Primary Examiner*—William R. Dixon, Jr.
*Assistant Examiner*—Anthony J. Green
*Attorney, Agent, or Firm*—Rhodes, Coats & Bennett

[57] ABSTRACT

A latex modified mortar or concrete material in which a polymeric or latex binding material is combined with a low shrinkage (gypsum) cement and fine fillers. Use of the low shrinkage cement and a higher than previously considered functional ratio of latex binding material to low shrinkage cement permits the resulting patching composition to obtain unexpectedly good adhesion, reduced cracking tendencies, dimensional stability, and flexibility required while maintaining enhanced strength properties. The polymeric binding material may be either an elastomeric or a thermoplastic latex.

3 Claims, No Drawings

MULTIPLE PURPOSE PATCHING COMPOSITION

This application is a continuation of application Ser. No. 07/167,991 filed Mar. 14, 1988 now abandoned.

This invention relates to multiple purpose patching compositions, and more particularly to an improved latex modified mortar in which an elastomeric or thermoplastic latex is combined with fine fillers and a relatively small amount of low shrinkage or expansive cement.

In conventional mortars and concretes, cement (generally Portland cement) serves as the primary binding agent. The Portland cement mixed with water causes the sand, gravel, crushed rock, or other aggregate to adhere together and harden when subjected to air. Cement, sand, and water form mortar which is used between building components such as brick, block, and tile causing such structural building components to adhere together when the mortar dries. Concrete, on the other hand, combines gravel or other aggregate with the mortar to form a structural solid material.

In the present application the following definitions are applicable:

"Latex" means dispersions of either elastomeric or amorphous thermoplastic polymer particles in water. The main elastomeric latexes are: natural rubber, styrene butadiene, polyacrylonitrile butadiene and polychloroprene. The primary thermoplastic latexes are: polyvinyl acetate, polystyrene, polyvinylchloride, polyacrylates, or their copolymers.

"Cements" are inorganic materials which set and harden when mixed with water and cause other things to bind together. Conventional cements include: compounds of calcium, aluminum, silicon, oxygen and/or sulphur including cements commonly referred to as "Portland" cements, aluminous, high alumina, and calcium aluminate cements, and variations of the foregoing with or without minor additives such as accelerators and retardants.

"Low shrinkage cements" are those cements which exhibit low shrinkage and/or expand during setting and include magnesium sulfate cements and gypsum cement. "Gypsum cements" are cements which include alpha or beta calcium sulphate hemi-hydrate.

"Fine Fillers" are fine particles typically with particle sizes in the range of 1.0 microns to 0.15 mm in diameter and including the following materials: silica or alumina materials such as fine sand, ground silica, colloidal or precipitated silica and corindon; carbonates such as natural or surface treated magnesium or calcium carbonate, or a calcium, barium or magnesium carbonate such as dolomite; sulphates such as calcium sulphate, for example, hydrated plaster and gypsum, insulation materials such as expanded glass or clays, vermiculite, perlite and celite; and expanded plastics such as polystyrene and polyurethane; metal filings; short milled fibres and mica.

"Sand" and/or "aggregates" generally means particles in the range of 0.05 mm to 6.0 mm and include the following materials: common or silica sand, light weight aggregates such as perlite, vermiculite, fly ash, pumice, expanded clay, expanded polystyrene beads, and carbon beads. Some mortars, useful as metal or wood fixes or patches may eliminate the sand from the mixture.

"Mortar" generally means mixtures of cement (or latex), sand, and water with or without minor additives such as air-entraining agents which set and harden after being mixed together. However, again for some uses the sand may be omitted.

"Concrete" is a material made by mixing mortar in its fresh, unhydrated state with coarse aggregates such as crushed stone having a typical particle size in the range of 6.0 mm to 50 mm.

Previously, it has been known that the properties of mortar and concrete can be improved by reducing the amount of water added to the mixture prior to setting and hardening. A certain minimum amount of water is needed in order to obtain the required workability or fluidity, and so water content can only be reduced if special techniques are used such as: adding plasticizers to the fresh mix; selecting a proper grading of aggregates used in the mix; selecting a cement which requires less water for the same workability (for example high alumina cements require less water than Portland cement); using vibration to place the mix which means less workability is needed; removing water after the fresh mix is in place (for example by spinning or subjecting the fresh mix to a vacuum); and adding latexes.

Latexes allow reduction of the amount of water used since they have a plasticizing effect on the mix. Latexes also form a three-dimensional film throughout the mortar or concrete on drying and this provides additional beneficial effects such as higher strength, greater wear resistance, greater durability, greater flexibility, and improved resistance to chemical attack. Latex modified mortars and concretes also have a much higher bonding strength with other materials compared to unmodified, or cement based mortars and concretes.

Conventionally, latexes are added to mortar or concrete by adding a small amount of latex to the fresh mix and reducing the amount of water to the extent that the same workability is obtained. Generally, in accordance with prior procedures a conventional mortar or concrete is made with a water/cement ratio by weight of approximately 0.40 to 0.50. Conversely a conventional latex modified mortar or concrete is generally made with equivalent workability at a water/cement ratio by weight of 0.30 to 0.40 due to the plasticizing effect of the latex. Note that latexes contain water, usually approximately 50% by weight, and this water must be considered as part of the mixing water.

It is known that fine fillers require more water in the mix, causing detrimental effects on conventional or unmodified mortars and concrete such as lower wear resistance, lower hardness, and lower strength and durability. As a result, various regulatory specifications for concrete and mortar (using cement as a primary binder) limit the amount of fine fillers which can be used in concrete to not more than 3%-5%, the actual amount in this range depending on the application. This practice of not using fine fillers in unmodified mortars and concrete has been carried over into latex modified mortars and concrete which first began to be commercialized widely in the 1950s.

In the present invention, the amount of polymeric binding material is, first of all, substantially increased. As a result, the amount of fine fillers can be increased. The attendant results include improvements in the physical properties after setting. Such improved properties include higher flexibility, higher impact resistance, higher tensile strength greater resistance to chemical attack, and improved binding with other materials.

Further the replacement of the reduced amounts of conventional Portland cement with a low shrinkage cement reduces shrinkage upon drying and thus minimizes the tendency to crack. Additionally, if a low shrinkage, gypsum cement is used it has now been determined that additional improved properties are obtained. For example the resulting composition also has improved workability, is faster setting, and faster curing. Further all of the benefits of greater flexibility, higher impact resistance, greater resistance to chemical attack, and improved bonding results are retained.

The patching composition of the present invention comprises in general the combination of a polymeric or latex binding material along with fine fillers and expansive cement. The preferred polymeric binding materials are either elastomeric or thermoplastic latexes

DETAILED DESCRIPTION OF A PREFERRED EMBODIMENT

In accordance with the present invention the elastomeric latexes are natural rubber, styrene butadiene, polyacrylonitrile butadiene, and polychloroprene. The preferred thermoplastic latexes are polyvinyl acetate, polystyrene, polyvinylchloride, polyacrylates, or their copolymers. The preferred expansive cement is gypsum.

A typical conventional latex modified mortar, which is representative of those known and used previously would include the ingredients set forth in the Table A below in the indicated parts by weight ratios:

TABLE A

| Ingredients | Parts by Weight |
|---|---|
| Sand | 300 |
| Portland Cement | 100 |
| Dow 460 Latex (50% water) | 20–40 |
| Antifoam B | 0.5 |
| Water | 34–12 |

In the Table A above DOW 460 Latex is a styrene butadiene latex and is available from Dow Chemical Company of Midland, MI. Antifoam B is an anti-foam agent available from Dow Corning Corporation. The weight of the latex comprises less than 40% of the weight of the cement.

In the following Table B, column A represents a preferred improved latex modified mortar, column B represents an alternative improved latex modified mortar, and column C represents a patching composition primarily formulated for wood or metal articles.

TABLE B

| | Parts by Weight | | |
|---|---|---|---|
| Ingredients | A | B | C |
| Sand | 300 | 300 | — |
| Duracal Cement | 25 | 25 | 25 |
| Veroc #1 Filler | — | 75 | 75 |
| Duramite | 75 | — | — |
| E330 Latex | 62.5 | — | — |
| Dow 460 Latex | — | 62.5 | 62.5 |
| Antifoam B | 0.5 | 0.5 | 0.5 |
| Water | — | — | — |
| Surfactant (Surfanol 104H) | 0.03 | 0.03 | 0.03 |

Duracal cement is a gypsum cement available from United State Gypsum Corporation of Chicago, IL. Duramite is a calcium carbonate filler available from White Pigment Corporation of Florence, VT. Veroc #1 is a calcium limestone filler, also produced by White Pigment Corporation of Florence, VT. E-330 Latex is an acrylic latex available from Rohm and Haas Chemical Company of Philadelphia, PA. Surfanol 104H is a surfactant available from Air Product and Chemical, Inc. of Allentown, PA.

In the patching compounds of Table B, the conventional Portland cement has been replaced by low shrinkage cement (gypsum). As a result the compositions exhibit improved workability in the fresh (wet) state, quicker sets, faster drying, and less shrinkage upon drying which would normally lead to cracks. In addition, the compositions of Table B will exhibit superior properties such as greater flexibility, higher impact resistance, greater resistance to chemical attack, and greater bond with other materials. If some or all of the sand is left out (column C) and the proportion of fine filler in the composition of Table B is increased a putty will result which can be used to fill holes, or as a putty for glazing in windows.

In its broader aspects the proposed mortar composition of the present invention combines the following ingredients in the indicated ranges:

| Ingredients | Range (Parts by Weight) |
|---|---|
| Sand | 0–400 |
| Gypsum Cement | 10–80 |
| Fine Filler | 90–20 |
| Latex | 40–65 |
| Water | 25–0 |
| Additives* | 0–2 |

*Additives include Antifoam agent, surfactants, retarders, etc.

While preferred embodiments have been described in detail hereinabove, it is apparent that various changes and modifications might be made without departing from the scope of the invention which is set forth in the accompanying claims.

What is claimed is:

1. A patching composition comprising:
   up to about 65 wt % sand having an average particle size substantially greater in diameter than 0.05 mm;
   about 16 to about 46 wt % inorganic fine fillers having an average particle size substantially less in diameter than 0.15 mm, wherein the combined weight of said sand and said inorganic fine fillers is greater than 50 wt % of the total weight of said patching composition;
   about 5 to about 15 wt % low shrinkage cement selected from the group consisting of gypsum cements and magnesium sulfate cements;
   about 14 to about 39 wt % latex binder selected from the group consisting of polyvinyl acetate, polystyrene, polyvinylchloride, polyacrylates, and copolymers thereof; and
   up to about 2 wt % additives, selected from the group consisting of anti-foaming agents, surfactants, and retarders.

2. The patching composition, according to claim 1, wherein said low shrinkage cement is a gypsum cement.

3. The patching composition, according to claim 1, wherein said latex binder contains about 50 wt. % solids and the balance is water.

* * * * *